Figure 1:
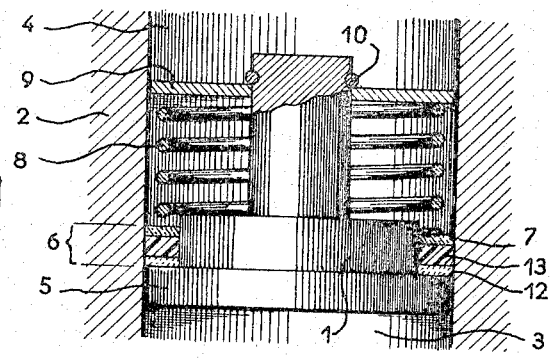

May 2, 1967 J. L. GRATZMULLER 3,316,940
SLIDING SEAL ASSEMBLIES
Filed June 29, 1964 4 Sheets-Sheet 1

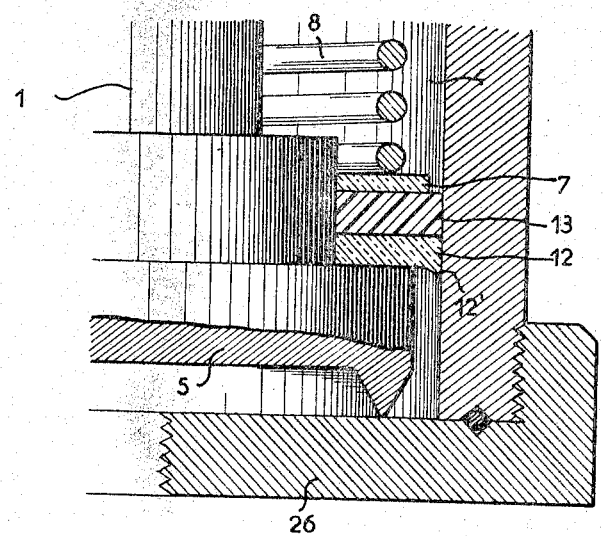
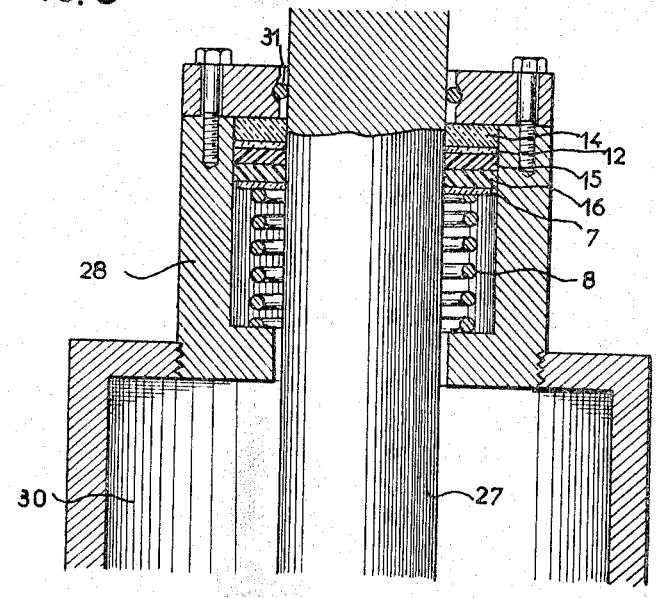

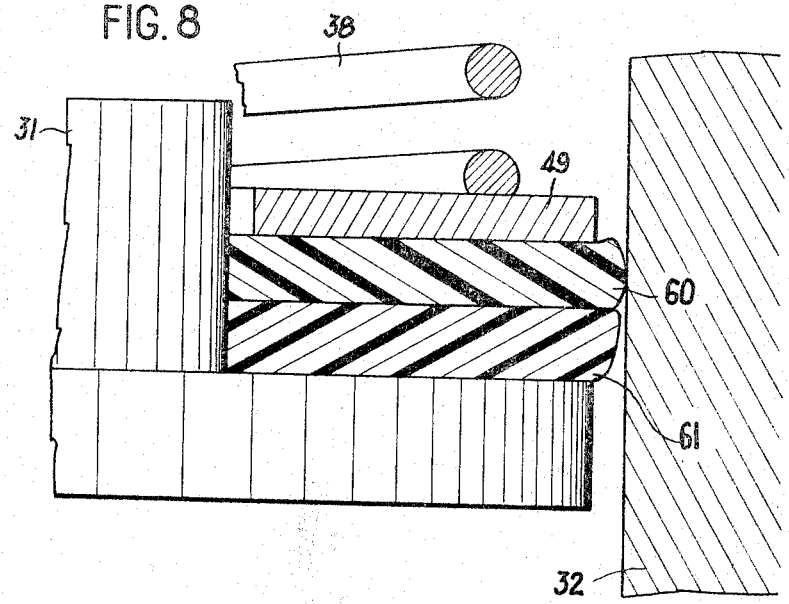
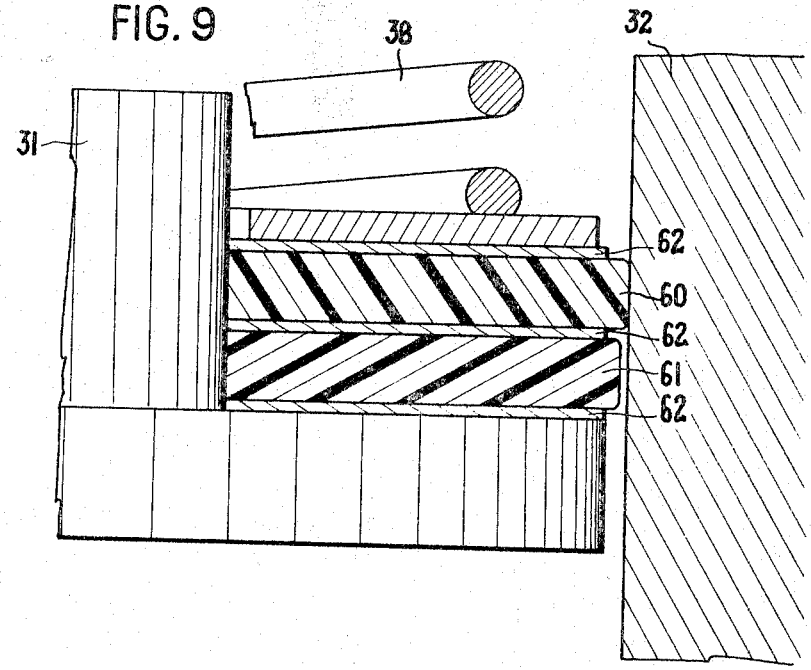

United States Patent Office 3,316,940
Patented May 2, 1967

3,316,940
SLIDING SEAL ASSEMBLIES
Jean Louis Gratzmuller, 66 Blvd. Maurice Barres,
Neuilly-sur-Seine, Seine, France
Filed June 29, 1964, Ser. No. 378,901
4 Claims. (Cl. 138—31)

This is a continuation-in-part of my copending application Ser. No. 197,011, filed May 23, 1962, entitled, "Sliding Seal Assembly," now abandoned.

This invention relates to sliding seal assemblies and more particularly to sliding seal assemblies between two coaxial members, such as a piston and a cylinder, a rod reciprocable in a casing, or like arrangements.

The elimination of wear between relatively slidable mechanical parts while preserving a fluid-tight sealing relationship between such parts has been a serious problem for many years and although numerous and varied solutions have been proposed, the problem has not been fully solved. The service life of mechanisms including such sliding seals is still limited by the useful life of the seal.

In my French Patent No. 1,024,868, there was disclosed a sliding seal assembly between two relatively movable coaxial cylindrical elements such as the cylinder and piston of a fluid pressure actuator or a hydropneumatic accumulator, including a seal ring of plastic and/or elastic material received in a recess formed in the piston, and permanently subjected to elastic pressure means, namely, spring means for providing a tight seal between the piston and cylinder.

Further, in my French Patent No. 1,132,624 was disclosed a type of sliding seal assembly especially well suited for use with the device of the first-mentioned patent, and which includes sealing portions of differential hardness ratings stacked in the axial direction. Thus, such a sealing assembly may comprise a stack of separate seal rings made from materials of different hardness. The advantage of such an arrangement is that the fluid seal function is performed by the softest portion of the seal assembly while the harder portion serves to resist creep or flow of the seal ring into the clearance space between the piston and cylinder.

An arrangement of this type, particularly when coupled with the pressurized seal of French No. 1,024,868, has made it possible to greatly reduce the principal cause of damage occurring in conventional sliding seals, namely, the flow of the elastic material constituting the seal, so that the resulting mechanisms were capable of performing greatly increased numbers of reciprocatory cycles. The limit set to the operation of such sealing means was frictional wear, together with a slight residual creep or flow of the softer portion of the composite sealing assembly which performed the sealing function proper.

It is among the objects of this invention to reduce and virtually eliminate these residual sources of damage to such known composite sealing assemblies, thus prolonging the service life of the sliding seals and the mechanical assemblies of which the seals form a part.

It will of course be appreciated that it is practically impossible to suppress completely the creep or flow of all parts of a seal, regardless of the type of material used for making the parts. The constructions heretofore proposed served essentially to reduce the amount of flow to an acceptably low value. Thus, considering for example, a hydropneumatic accumulator adapted in service to be exposed to very high oil pressures in one compartment on one side of the piston and to very high gas pressures in the other compartment, it is clear that the cylinder of such an accumulator must be deformed in service under the internal pressure. Despite careful machining in manufacture and even disregarding temperature variations in service, the clearance values between the cylinder and the floating piston therein will not remain constant with time and throughout the axial extent of the cylinder. The requisite seal across the piston will of course still be ensured, notwithstanding such clearance variations throughout the piston stroke and despite temperature variations, due to the continuous engagement provided between the more deformable parts or portions of the sliding seal assembly and the cylinder. However, it is inevitable that the more deformable parts of the seal assembly will become more or less greatly extruded and creep into the increasing clearance spaces, i.e. will flow, greatly increasing the likelihood of damaging shear and metal-to-metal friction between the piston and cylinder.

It is an object of this invention to provide a novel sliding seal assembly in which the inevitable flow or creep of a portion of the seal will be utilized for protecting another portion of the seal against flow or creep, and the consequent damages. In other words, the inevitable flow characteristic of a part of the sliding seal is employed for improving the overall performance of the sliding seal with respect to conventional sliding seals.

The attainment of the above objects is possible for the following reasons. As indicated above, in cases where the flow of a sealing member has been considerably reduced as is the case with a sealing assembly of the type disclosed in French Patent No. 1,132,624, the damage that ultimately sets a limit to the satisfactory operation of the seal after a great many reciprocatory cycles, is due for a major part to frictional wear of the more deformable sealing portion of the assembly against the adjacent metal surface, e.g. the inner cylinder surface. Such wear occurs for two main reasons:

First, at the outset of the service life of the mechanism, minute asperities present on the inner cylinder surface during the usual prolonged running-in period act to tear off and wear away non-negligible portions of the sealing material.

Second, throughout the service life of the machine, scouring occurs through friction between the cylindrical portions and the ingress of dirt, contaminants or other foreign matter onto the inner cylinder surface, which further serve to damage the seal.

It is an object of the invention to reduce or eliminate both these causes of wear and tear in a sliding seal. Since according to the invention the flow or creep is allowed to occur in a controlled amount in a part of the sliding seal assembly so selected that such creep will be advantageous rather than damaging, useful operating periods are obtainable for reciprocatory and other mechanisms incorporating sliding seals, greatly in excess of anything heretofore attainable.

According to the invention, a sliding seal assembly between two relatively slidable cylindrical elements may comprise at least two stacked ring members received in an annular recess defined in one of said elements, means for continually applying axial thrust to the stacked ring members, at least one of the ring members being made from a relatively soft elastomer composition for providing a tight sealing engagement between the elements by continuous contact along at least one circumferential line, and at least one other of the ring members being dimensioned for engaging a cylindrical surface of the other element, with such latter member being made from a relatively hard, elastic composition having low friction coefficient and/or self-lubricating characteristics, so as to impart to the cylindrical surface with which such ring member is in sliding engagement an anti-binding characteristic with respect to the said elastomer.

Preferably, the seal assembly further comprises another ring member of relatively hard material so disposed with respect to the first two ring members that the softer one or ones of the ring members will be positioned or sandwiched between the harder ring members of the assembly.

The relatively hard, low-friction ring member, which which imparts the non-binding characteristics to the cylindrical surface with which it is in frictional engagement, may be made of a polyfluoroethene type composition such as tetrafluoroethylene or Teflon, and is positioned on the low pressure side of the softer sealing ring member or members, namely, that side into which the soft ring member would tend to flow or creep.

In one simple embodiment of the invention, wherein the sliding seal is mounted on the piston of a pressure fluid actuator or ram, or a hydropneumatic accumulator, the first ring to be mounted in contact with the annular piston surface defined by a recess or groove in the piston, is the hard, low-friction ring, next one or more of the softer rings made from an elastomer (neoprene or Perbunan) and lastly, if desired, a third ring made from any suitable hard material such as metal, with such third ring being engaged by resilient pressure means such as a spring for transmitting the axial thrust from such third ring to the intermediately-positioned, deformable rings.

In the present sliding seal assembly, the harder rings, due to their comparatively great hardness, prevent the flow or creep of the softer intermediate ring or rings and, in addition, one of the hard Teflon rings protects the soft rings from wear due to a thin film or protecting material, such as a fluorinated compound, deposited by such ring through friction over the inner surface of the cylinder, and such a film is known to exert an extremely efficient self-lubrication action in covering any minute asperities present on said surface whereby the service lives of the assemblies are increased in an unparalleled manner.

It will be realized that such self-lubricating action and the resulting protection will only be effective provided the hard self-lubrication ring member engages the cylinder throughout its periphery. As earlier indicated, however, the inner dimensions of a cylindrical member cannot be expected to maintain strictly constant values with time, nor can they be made strictly uniform throughout the length of the cylinder. Of course, this is immaterial from the mere standpoint of sealing efficiency, since the softer rings are sufficiently deformable to remain resiliently applied in firm engagement against and throughout the cylinder surface. However, such lack of uniform dimensions has, as previously noted, damaging consequences on the service lifetime of the seal. Even though the hard ring member or members be conformed with accuracy to dimensions corresponding to the inner cylinder diameter, such rings in view of their low deformability cannot be expected to be applied uniformly into engagement throughout the circumference of the cylinder, unless impossibly high spring pressures be used, which pressures would apply intolerably high crushing strains to the softer rings.

It has been found that in an improved composite sliding seal assembly according to the invention, the low-friction, self-lubricating hard ring made of fluorine-base polymer or the like, cooperates with the deformable ring component of the assembly in an unexpected and advantageous manner. In any pressure-fluid operated, reciprocatory mechanism of the general type to which the sliding seals of the invention are applicable, there will usually occur an operating phase or condition in which the inner cylindrical member or piston is situated at an end position with respect to the outer member or cylinder, while being subjected to high axial pressure from the fluid. Thus, considering for example a hydro-pneumatic accumulator, the piston separating the gas-filled compartment from the oil-filled compartment, is in normal operation substantially free-floating in a balanced condition between the two fluids. However, in case of a lack of oil in the accumulator (during inflation of the accumulator), the piston will be displaced to an end position abutting the cylinder end and similar situations will occur in a pressure fluid actuator. In such a situation, the seal assembly is subjected to the full axial pressure load from one side only. At such a time, the soft seal ring will tend to flow toward the hard self-lubricating ring and will squeeze it violently against the cylinder surface and the low-pressure zone. Under this violent axial thrust, the hard ring in turn is subjected to flow, though to a very small degree owing to its hardness, and a small but definite peripheral lip or flange is formed around the circumference of the hard ring which is directed into the clearance space between the piston and cylinder. This provides an intimate contact engagement between the hard ring and the cylinder throughout the circumference of the cylinder so that the entire cylinder surface is assured of being wiped by the lip and thereby coated with the self-lubricating film at each reciprocatory movement of the piston. At the same time, of course, a flowing or creeping of the softer seal ring is positively prevented owing to the complete elimination of all clearance between the hard ring and the cylinder.

A similar type of operation will result in the case of an improved sliding seal incorporated in the piston of a single-acting pressure actuator, since the pressure is at all times applied to a single side of the piston and results in the advantageous deformation or flow of the hard self-lubricating ring.

Thus, it will be seen that in the present sliding seal a positive advantage is derived from the unavoidable, and heretofore undesired flowing of a part of the composite seal, in that only that part of the seal assembly is allowed to flow in which the flowing will produce a beneficial result.

According to a feature of the invention, such favorable flow of the hard ring component of the seal resulting in a peripheral deformation and a consequent tight engagement throughout the circumference, is desirably accomplished in the workshop on manufacture of the mechanism, by the deliberate application of a suitable axial pressure. Thus, the assembly is preconditioned so as to provide optimum operation from the outset. This preconditioning step is especially useful in cases where the afore-mentioned axial pressure condition is not liable to occur in actual service, and in cases where the seal assembly is disposed in the outer or female cylindrical member.

A further object of the invention is to provide a sliding seal assembly defined by a plurality of deformable ring members of different hardness ratings with each such deformable ring being separated from its adjacent ring by means of a ring member of self-lubricating material such as polytetrafluoroethylene or polytrifluorochloroethylene, so that the deformable rings are never in engagement with each other but rather the two plane surfaces of each deformable ring are in facial contact with the rings of self-lubricating material.

It has been determined that when there are variations in temperature, the deformable rings change in hardness and are subject to detrimental variations in fluid tightness. Hence, in the case of cooling, one ring may retract more sharply and tend to endanger or prevent contact with the surface of the cylinder, or at least not be capable of undergoing a sufficient deformation, but, as previously stated, such deformations are essential for assuring permanent contact of at least one of the deformable rings with the surface of the cylinder. It has also been ascertained that there is the possibility of the surfaces of adjoining deformable ring members sticking so that under the compression effect, the deformations of these rings occurs within the mass of the ring causing the same to function in a shearing fashion.

By virtue of the fact that the deformable ring members are sandwiched between the ring members of self-lubricating material, the sticking together of the deformable rings is positively prevented and deformation of each deformable ring member is facilitated under the compressive action of the spring means due to the slippage of such ring members between the ring members of self-lubricating material thereby assuring better contact with the surface of the cylinder.

Furthermore, contrary to prior practice, in the present invention use is no longer made of the cylindrical rim of the ring member of self-lubricating material for contact with the wall of the movable member relative to that in which the rings were mounted but rather their face which is perpendicular to the axis of the cylinder.

Another object of the invention is to provide a seal assembly wherein at least one face or surface of the relatively hard, low-friction ring member is provided with a coating or layer of self-lubricating material.

Figure 3:
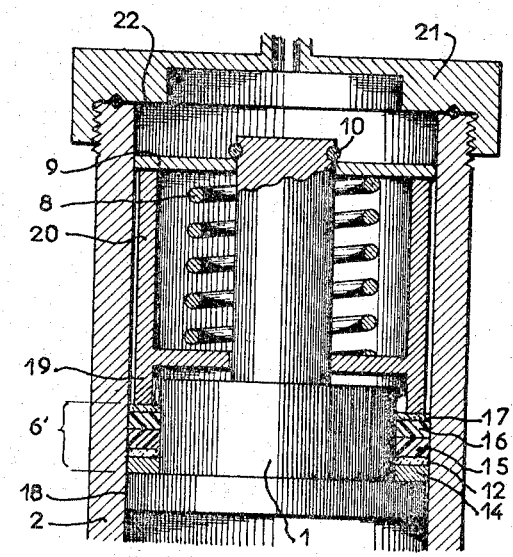
Figure 4:
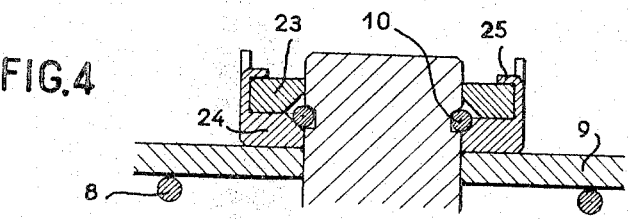
Figure 6:
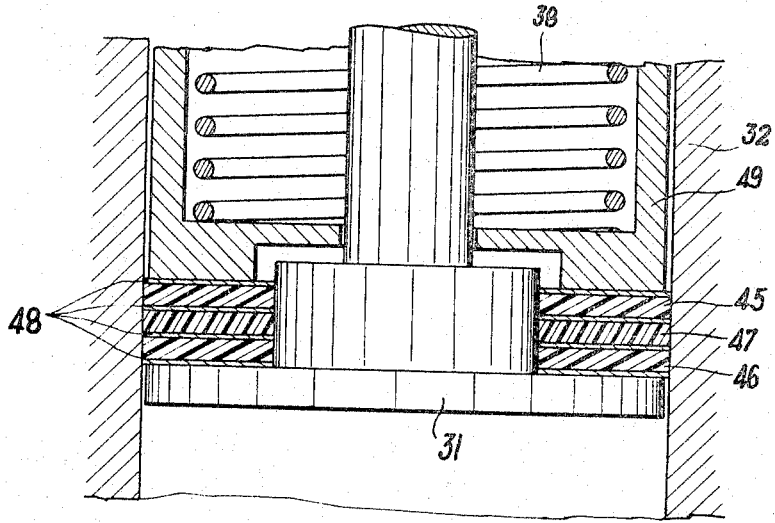
Figure 7:
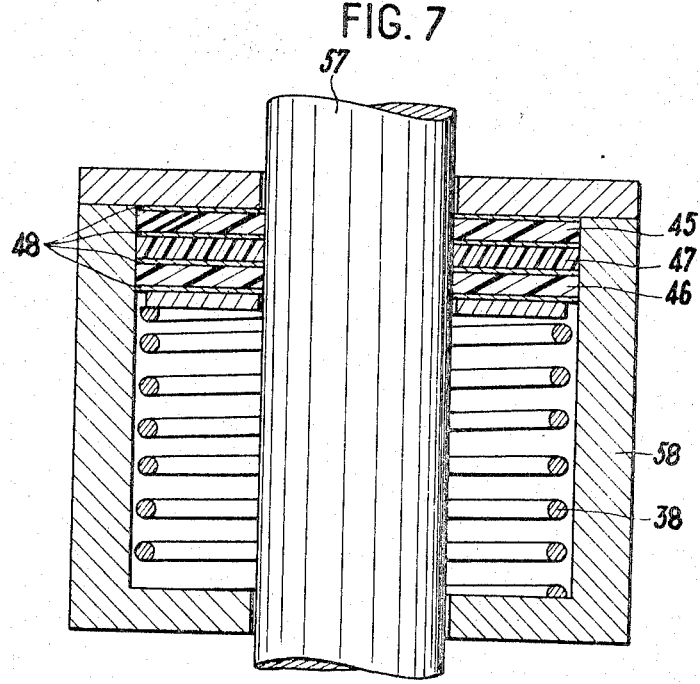

Additional objects and advantages of the invention will become more readily apparent from the following detailed description and annexed drawings, in which drawings:

FIG. 1 is a simplified, fragmentary view in section on a diametric plane, showing a piston slidable within a cylinder and comprising an improved sliding seal assembly according to the invention, FIG. 2 is a fragmentary view of FIG. 1 on an enlarged scale, illustrating the peripheral lip or flange formed around the hard self-lubricating ring component by flowing thereon on abutment of the piston against the end of the cylinder pressure, FIG. 3 is a sectional view generally similar to FIG. 1 illustrating another embodiment of a sliding seal assembly according to the invention, including a sleeve-like pressure member for abutment of the piston against the cylinder head, FIG. 4 is a fragmentary detail view of FIG. 3 on a larger scale, illustrating details of the retainer means for the seal-pressing assembly, FIG. 5 is a simplified view mostly in diametric cross section, illustrating the improved sliding seal of the invention mounted in the outer or female part of a sliding seal of a reciprocating rod or shank in a cylinder or the like, FIG. 6 is a fragmentary view, partly in section and partly in elevation, of an oleopneumatic accumulator in which the seal assembly includes deformable rings sandwiched between self-lubricating rings, FIG. 7 is a view similar to FIG. 6 showing the seal assembly provided between a shaft and a housing or casing, FIG. 8 is a diagrammatic view illustrating the behavior of deformable rings mounted on the free piston of the accumulator without the use of self-lubricating rings, and FIG. 9 is a view similar to FIG. 8 showing the behavior of the deformable rings when sandwiched between self-lubricating rings.

In FIG. 1 is illustrated part of a conventional hydropneumatic accumulator device comprising a floating piston 1 slidable in a cylinder 2 and defining in the cylinder a lower liquid-filled compartment 3 and an upper gas-filled compartment 4. The piston 1 is formed with a disk element 5 which defines an annular recess for an annular seal assembly generally designated 6. The annular seal assembly 6 is at all times subjected to axial pressure from a compression coil spring 8 coaxially surrounding the piston 1 and seated at one end on a washer 7 positioned atop the seal assembly 6, and at its other end against a disk 9 retained in position around an axially projecting shank 1a of the piston 1 by a spring retainer clip 10.

In the embodiment illustrated in FIG. 1, the annular seal assembly 6 comprises a base ring 12 of a relatively hard self-lubricating plastic material such as polyfluoroethylene, and an overlying ring 13 of relatively soft elastomer composition. Thus, by way of example, the base ring 12 may be the material known in the trade as Teflon, and ring 13 may be neoprene or Perbunan composition having a Shore hardness number of from 60 to 80. The softer component or ring 13 acts to provide the actual seal, with the harder self-lubricating ring 12 preventing the seal assembly from flowing or creeping between the disk element 5 and the cylinder, while depositing a self-lubricating coating over the inner cylinder surface protecting the ring 13 against wear. By way of example, it may be indicated that in the case of a cylinder having a diameter of about 50 mm., the Teflon ring 12 may be about 1 to 2 mm. in thickness and the softer ring 13 about 2 to 4 mm. The washer 7 may be brass and about 2 to 3 mm. in thickness. The ring 12 may be considerably thinner than the deformable ring 13, e.g. 3 to 10 times thinner depending on conditions, so that a very small amount of relatively expensive material such as Teflon is required.

The calibration of the seal rings, including both the Teflon ring and the intermediate seal ring, is not particularly critical since the operating pressures to which the rings are subjected in service can be relied upon to crush them sufficiently to apply both rings into firm contact with the inner surface of cylinder 2. Thus, such rings may be readily produced by stamping from suitable sheet materials, without expensive molding operations and permitting nondestructive production inspection tests. The rings 12 and 13 may be stamped to a diameter slightly smaller, e.g. by $\frac{1}{10}$ mm., than the diameter of the cylinder bore, while the spring seating washer 7 may have a diameter smaller by, say, $\frac{2}{10}$ mm. than the cylinder bore.

FIG. 2 shows on an enlarged scale the condition assumed by the sealing assembly of FIG. 1 when the piston 1 engages end plate 26 of the cylinder on the lower or liquid-filled side. This condition will arise in particular on "inflation" of the hydropneumatic accumulator, as pressure gas is filled into the compartment 4. The requisite seal is provided by the ring 13 which is applied by the pressure of spring 8 against the cylinder wall. Consequently, the full thrust of the gas pressure, which may be several hundred kilograms per square centimeter, is transmitted to the rings 12 and 13 and tends to push both rings towards the cylinder end surface 26 through the annular clearance space (exaggerated for clarity in the drawings) present between the disk element 5 and the cylinder wall. The relatively hard Teflon ring 12 in the initial condition, was not pressed sufficiently hard by the spring 8 to be in intimate engagement with the cylinder wall surface. However, due to the inflation pressure mentioned above which now is transmitted thereto through ring 13, the ring 12 is deformed and undergoes a slight degree of flow, forming a peripheral lip or bead as shown in exaggerated form at 12′, which narrowly engages the cylinder surface throughout its circumference. It will be seen that as soon as the piston initiates its upward stroke in the cylinder, the ring 12 will deposit a thin film of lubricating material over the cylinder wall surface. At the same time, it will be seen that the ring prevents any flow or creep of the softer ring 13, which remains completely undeformed due to containment by the harder ring 12.

In the embodiment shown in FIG. 3, composite seal assembly 6′ provided between a piston 1 and cylinder 2 of a hydropneumatic accumulator or the like, comprises a stack of annular ring members including a base ring 14 made of nonbinding metal, a hard self-lubricating polytetrafluoroethylene or equivalent ring 12, a pair of similar rings 15 and 16 of softer material such as neoprene or Perbunan, with the upper ring being possibly somewhat softer than ring 15, and a spring seat or presser ring 17, which may also comprise nonbinding metal. It will be understood that more than two deformable rings may be provided if desired. In cases where such deformable rings are of different hardness ratings, the softest of the stack is preferably positioned centrally and harder and harder rings are provided at increasing distances from such central ring in either direction.

By way of example, such a stacked seal assembly may include as the deformable section thereof, three elastomer rings with a central ring having a Shore hardness number 65 and two end rings of Shore hardness number 78, each ring being about 2 mm. in thickness (in the case of a cylinder bore about 60 mm. dia.), while the hard base ring 12 is Teflon with a thickness of 1 to 1.5 mm.

In the embodiment of FIG. 3, the spring 8 compresses the seal assembly 6' with a force of the order of about 50 to 100 kg., through an annular presser sleeve member 19 having a tubular extension 20 extending to the undersurface of the upper washer 9 which serves as a seat for the upper end of spring 8.

Upper end wall 21 of the cylinder 2 is so formed that in the upper end position of piston 1, a condition which arises in case of no air being present in the upper space of the hydropneumatic accumulator cylinder (the reverse condition from that assumed in FIG. 2), the piston will not engage the cylinder directly, but by way of the assembly illustrated. That is, in the uppermost position of the piston, the washer 9 engages an upper shoulder 22 in the cylinder 22 and exerts pressure through the tubular part 20-19 against the seal assembly 6', which thus takes up the entire pressure applied to piston 1. It will be understood that various other abutment arrangements may be used, it being noted that the piston and the seal assembly need not necessarily attain their abutting positions at exactly the same time, thereby increasing permissible tolerances on the various components of the assembly and facilitating production.

Every time the pressor washer 9 abuts against the upper cylinder shoulder 22, resilient retainer ring 10, which may be piano wire, serving to retain the presser washer 9 against the action of spring 8, is relieved from pressure, and on subsequent downward displacement of the piston in the cylinder away from its uppermost end position, the retainer ring 10 is again subjected to pressure. Consequently, in this form, the retainer assembly is desirably formed in the manner shown in detail in FIG. 4. The retainer assembly comprises a pair of annular members 23 and 24 seated one atop the other, and formed with chamfers in their facing inner peripheries to define an annular channel surrounding the piston shank, with the piano wire retainer ring 10 being contained within such channel. Further, both members 23 and 24 are firmly secured to one another as by crimping an upstanding peripheral flange 25 of the lower member 24 around the top of the upper member 23.

FIG. 5 illustrates an improved sealing assembly interposed between a pair of relatively slidable cylindrical members 27 and 28, such as a rod 27 slidable in packing case or stuffing box 28. In this case, the seal assembly is disposed within the packing case 28, shown as being secured to the top of a cylinder 30 through which the slidable rod 27 extends and in which a high pressure is present. The annular recess defined in the packing case 28 contains the seal assembly of the invention together with its compression spring 8. As shown, the seal assembly comprises a base ring 12 of Teflon or hard material of generally similar self-lubricating properties, and two deformable rings 15, 16 of softer material for providing the sealing action proper. A presser ring 14 of nonbinding metal is shown for guiding the rod 27 at its point of outlet from the packing case 28. A wiper ring 31 of suitable plastic material engages the periphery of the rod 27 and is retained in an annular groove in the cover of the packing case 28 with the ring 31 serving to wipe off dirt or other foreign particles from the rod and prevent their ingress into the case where such particles could damage the seal assembly.

With reference to FIG. 6, there is shown an oleopneumatic accumulator in which 32 denotes the cylinder and 31 a free piston. The piston 31 is provided with a disk 31' of lesser diameter for forming an annular recess between the outer periphery of such disk and the inner surface of the cylinder adapted to receive a seal assembly. The seal assembly is subjected to the continuous action of a compression spring means 38 via a sleeve member 49.

The seal assembly is constituted by a plurality of rings 45, 46 and 47 with the rings 45 and 46 being of relatively high hardness characteristics for assuring fluid-tightness upon relative elevation of the temperature thereof while the ring 47 is of softer material for assuring fluid-tightness when the temperature of the rings is relatively low.

It should be explained that the sealing rings in Gratzmuller #2,847,262, have different hardness characteristics and are liable to be subjected not only to a constant spring pressure, but also to both the constant spring pressure and the internal gas pressure prevailing in a hydropneumatic accumulator when emptied of hydraulic fluid. Such combined spring and gas pressures tend to compress the sealing ring $a$ of lower hardness between the sealing ring of greater hardness $b$ and a seal compressing metal member 5.

The sealing rings $a$ and $b$ are normally subjected to the predetermined constant pressure exerted by spring 4, with the gas pressure at one side of piston 2-6 and the sealing rings $a$-$b$ are directly exposed to the two fluid media under pressure and the motion of the floating piston is opposed by friction to such a slight extent that there can never exist any material difference in the pressure on opposite sides of the piston, so long as there is some liquid or hydraulic fluid under pressure in cylinder 1. However, as soon as cylinder 1 is emptied of hydraulic fluid, piston 2-6 is applied on the bottom of cylinder 1 by the relatively high gas pressure and the rings $a$-$b$ will now be subjected to said gas pressure adding itself to the action of the constant spring pressure. The resulting high compression of the sealing rings with consequent additional radial deformation of the softer ring relative to the harder ring may cause such unprevisible interpenetration of the ring materials that one ring will adhere or stick to the other ring so that the additionally radially deformed softer ring is prevented from retracting to its normally deformed shape when cylinder 1 is re-filled with hydraulic fluid. It goes without further reference that the overdeformed softer ring $a$, although prevented by the harder ring $b$ from extruding, will increase the frictional resistance of piston 2-6 and thus increase the pressure differential on opposite sides of the piston during operation of the accumulator. It is also easy to understand that if ring $b$ is made of a material to which ring $a$ cannot adhere, stick or bind when both rings are subjected to high compression force, ring $a$ will be allowed to retract radially and expand axially to its initially deformed shape, due to spring pressure alone, as soon as the gas pressure is again balanced by the pressure of the hydraulic fluid.

It will be observed that each of the rings 45–47 is separated by means of rings 48 of a self-lubricating material such as commercially available under the notation Teflon. Since the sealing or deformable rings are sandwiched between the self-lubricating rings 48, each sealing ring may be freely radially deformed or expanded by the compression applied axially by the spring means 38 through the sleeve member 49.

In FIG. 7 there is illustrated an arrangement including a housing or casing 58 in which is slidably mounted a rod or shaft 57. A spring means 38 is located within the housing and a sealing assembly similar to that disclosed in FIG. 6 is positioned within the housing.

With reference to FIG. 8, two sealing rings 60 and 61 of different hardness characteristics are located within the cylinder 32 and such rings are not separated by means of self-lubricating rings and the rings are subject to the action of the spring 38. If the ring 60 is of softer material than the ring 61 and the temperature increases yet does not attain a degree sufficient to affect the ring 61, the ring 60 will be compressed and flattened by the spring 38 while the ring 61 remains relatively hard and barely makes contact with the inner surface of the cylinder 32. Consequently, the rings 60 and 61 will not only be deformed or expanded as a result of the temperature but will deform differently dependent upon the hardness characteristics of the respective rings.

Since the rings 60 and 61 may have a tendency to stick together on the one hand and against the surfaces of the members between which they are positioned on the other hand, the deformation or expansion occurs within the mass of the rings. In addition, the rings have a tendency to deform improperly and the contact between the ring 60 and the inner surface of the cylinder 32 may be reduced due to such improper deformation.

In FIG. 9, it will be seen that the sealing rings 60 and 61 are entirely separated by thin rings 62 of self-lubricating material such as Teflon. In other words, the sealing rings are sandwiched between rings possessing self-lubricating characteristics. By reason of this particular arrangement, there is no likelihood of the rings 60 and 61 sticking to the rings 62 on opposite surfaces thereof and these rings deform fully via simple compression. Hence, the rings 60 and 61 deform more easily, thus assuring better contact with the inner surface of the cylinder 32 and their life is substantially augmented.

It will be appreciated from FIG. 9 that the softest ring 60 can slide under the compressive action of the spring 38 so as to apply subsequently substantially the entire lateral surface thereof against the inner surface of the cylinder 32 for assuring perfect fluid-tightness whereas the harder ring 61 will slide in parallelism therewith for making full contact with the cylinder's inner surface in the event of a further rise in temperature.

As previously noted, the soft sealing section of the stacked assembly may comprise two or more rings of different hardness, with the softest preferably disposed toward the center of the stack. The differential hardness rings used in the sealing section preferably have different hardness characteristics as a function of temperature, so as to provide better sealing performance over a wide temperature range.

It will of course be understood that various changes and modifications may be made in the embodiments illustrated and described without departing from the scope of the invention. While in the present state of the art compositions of the type broadly known as polyfluoroethanes, including polytetrafluoroethylene (Teflon) and polytrifluorochloroethylene, are found especially suitable as the material from which the hard, self-lubricating ring component of the assembly may be made, any other compositions having equivalent properties may of course be used.

I claim:

1. In a hydropneumatic accumulator of the type including a cylinder, a piston slidably mounted within the cylinder to divide the cylinder space into a gas chamber and a liquid chamber, said piston including a disc element, a reduced cylindrical portion extending axially of the disc element, abutment means carried by the piston in axially spaced relation from the disc element, elastically and plastically deformable sealing ring means mounted around the reduced cylindrical portion of the piston and including at least two zones of different hardness characteristics, a seal compressing means on the reduced cylindrical portion of the piston bearing against said sealing ring means, resilient means biased between said seal-compressing means and said abutment means to continuously compress said sealing ring means against the interior of the cylinder, and a polytetrafluoroethylene ring interposed between said sealing ring means and said disc element and so dimensioned as to have its outer cylindrical surface in contact with the interior of said cylinder.

2. In a hydropneumatic accumulator of the type including a cylinder, a piston slidably mounted within the cylinder to divide the cylinder space into a gas chamber and a liquid chamber, said piston comprising a disc element, a reduced cylindrical portion extending axially of the disc element, abutment means carried by the piston in axially spaced relation from the disc element, sealing means including a plurality of sealing rings of different hardness characteristics and of substantially rectangular cross section mounted around the reduced cylindrical portion of the piston, a ring of self-lubricating material interposed between each sealing ring and its adjacent sealing ring whereby the plane surfaces of each sealing ring are in contact with the rings of self-lubricating material only, a seal compressing means on the reduced cylindrical portion of the piston bearing against the sealing means, and resilient means biased between the seal compressing means and the abutment means for exerting a substantially constant axially directed pressure on the rings for elastically expanding the sealing rings.

3. The sealing arrangement as claimed in claim 2, in which the rings of self-lubricating material are of substantially less thickness than the sealing rings.

4. The sealing relationship as claimed in claim 2, in which said self-lubricating rings are Teflon and said sealing rings are elastomers.

References Cited by the Examiner

UNITED STATES PATENTS

| 2,847,262 | 8/1958 | Gratzmuller. | |
| 2,912,266 | 11/1959 | Nordell | 277—125 X |
| 3,013,823 | 12/1961 | Schulz | 277—125 |
| 3,039,780 | 6/1962 | Nordell | 277—125 |

FOREIGN PATENTS 856,690  12/1960  Great Britain.

LAVERNE D. GEIGER, *Primary Examiner.*

LEWIS J. LENNY, T. L. MOORHEAD, *Examiners.*